(12) United States Patent
Kim et al.

(10) Patent No.: US 12,095,714 B2
(45) Date of Patent: Sep. 17, 2024

(54) METHOD AND APPARATUS FOR MESSAGING SERVICE

(71) Applicant: KAKAO CORP., Jeju-si (KR)

(72) Inventors: Eun Hye Kim, Seongnam-si (KR); Han Wool Cha, Seongnam-si (KR); Seok Gyu Lee, Seongnam-si (KR); Sul Gi Kim, Seongnam-si (KR); In Hae Choi, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 18/318,636

(22) Filed: May 16, 2023

(65) Prior Publication Data
US 2023/0370405 A1    Nov. 16, 2023

(30) Foreign Application Priority Data

May 16, 2022    (KR) .......................... 10-2022-0059845

(51) Int. Cl.
*H04L 51/046*    (2022.01)
*H04L 51/06*    (2022.01)
*H04L 51/52*    (2022.01)

(52) U.S. Cl.
CPC ............ *H04L 51/046* (2013.01); *H04L 51/06* (2013.01); *H04L 51/52* (2022.05)

(58) Field of Classification Search
CPC ....... H04L 51/046; H04L 51/06; H04L 51/52; H04L 51/226; H04L 51/04; H04L 51/043; G06Q 50/40
See application file for complete search history.

(56) References Cited

U.S. PATENT DOCUMENTS

| | | | |
|---|---|---|---|
| 2002/0174248 A1* | 11/2002 | Morriss | H04L 9/40 709/204 |
| 2005/0260974 A1* | 11/2005 | Lee | H04M 11/10 455/412.2 |
| 2008/0261564 A1* | 10/2008 | Logan | H04M 1/656 379/67.1 |

(Continued)

FOREIGN PATENT DOCUMENTS

| | | |
|---|---|---|
| JP | 2020154403 A | 9/2020 |
| JP | 2020177665 A | 10/2020 |

(Continued)

OTHER PUBLICATIONS

Technical Hyoronsha Editorial Department, Au AQUOS Wish SHG06 Smart Guide, 1st Edition, Incorporated Company Technical Hyoronsha Iwao, Apr. 27, 2022, and ISBN78-4-297-12753-4C3055. (2 pages).

(Continued)

*Primary Examiner* — Michael Won
(74) *Attorney, Agent, or Firm* — SEED IP LAW GROUP LLP

(57) ABSTRACT

A method and an apparatus for a messaging service are disclosed. A method of operating a server that provides a reserved message function interlinked with an app for a messaging service includes identifying a reserved message scheduled to be sent, determining whether a chat room corresponding to a destination of sending the identified reserved message is valid, and sending the identified reserved message through the chat room.

19 Claims, 12 Drawing Sheets

(56) References Cited

U.S. PATENT DOCUMENTS

| | | | | |
|---|---|---|---|---|
| 2010/0246785 | A1* | 9/2010 | Wang | H04M 3/48 |
| | | | | 379/88.23 |
| 2011/0047483 | A1* | 2/2011 | Low | H04W 4/12 |
| | | | | 715/752 |
| 2020/0219183 | A1* | 7/2020 | Cho | G06Q 40/02 |
| 2022/0311727 | A1* | 9/2022 | Agarwal | H04L 51/214 |
| 2023/0171220 | A1* | 6/2023 | Khosrowshahi | H04L 51/52 |
| | | | | 715/752 |

FOREIGN PATENT DOCUMENTS

| | | |
|---|---|---|
| KR | 20160110324 A | 9/2016 |
| KR | 20170062836 A | 6/2017 |
| KR | 20180112196 A | 10/2018 |
| KR | 102354743 B1 | 1/2022 |

OTHER PUBLICATIONS

Korean Office Action dated Apr. 15, 2024, for Korean Application No. 10-2022-0059845. (11 pages).

Japanese Office Action dated May 28, 2024, for Japanese Patent Application No. 2023-081059. (8 pages).

\* cited by examiner

METHOD AND APPARATUS FOR MESSAGING SERVICE

CROSS-REFERENCE TO RELATED APPLICATION

This application claims the benefit of Korean Patent Application No. 10-2022-0059845 filed on May 16, 2022, in the Korean Intellectual Property Office, the entire disclosure of which is incorporated herein by reference for all purposes.

BACKGROUND

Technical Field

One or more embodiments relate to a method and an apparatus for a messaging service, more specifically, to a server providing a reserved message function interlinked with an app for the messaging service.

Description of the Related Art

The advancement in mobile smart devices has increased the use of online platform services for interaction with other users over a network. The online platform services for interaction with other users may include, as representative examples, a social networking service (SNS) which is an online platform for generating and consolidating social relationships through communication among users, information sharing, and expansion of personal connections, and an instant messaging service (IMS) which is an online platform for real-time content communication between two or more users.

The increase in communication via mobile devices has further allowed the online platform services to support functions for sharing various types of data and assisting communication in addition to a function for users to have one-on-one communication with other users by text.

BRIEF SUMMARY

Embodiments provide a messaging service including a reserved message function that sends a pre-written message to a predetermined destination at a predetermined time by a user request, besides a function of sending a written message by a user in real time.

Embodiments provide a reserved message function for preventing abusing a messaging service.

However, the technical aspects are not limited to the aforementioned aspects, and other technical aspects may be present.

According to an aspect, there is provided a method of operating a server that provides a reserved message function interlinked with an app for a messaging service including identifying a reserved message scheduled to be sent based on a record on a reserved message stored corresponding to a first user account subscribing to the messaging service, determining whether a chat room corresponding to a destination of sending the identified reserved message is valid, and sending the identified reserved message through the chat room based on the determining of whether the chat room is valid.

A reception confirmation status for a message received through the chat room before sending the reserved message may be changed in response to access to the chat room by a terminal logged in with the first user account.

The method may further include controlling a chat interface provided to a terminal logged in with a participant account of the chat room to display a changed reception confirmation status for the message received through the chat room.

The reserved message may be displayed on a chat interface corresponding to the chat room along with a mark to distinguish the reserved message from a general message.

The method may further include identifying a reserved message to be reminded based on information about a reminder setting in the record on the reserved message and sending a reminder message to notify that the reserved message to be reminded is scheduled to be sent through a predetermined type of chat room corresponding to the first user account.

The destination of sending the reserved message may include at least one of a second user account subscribing to the messaging service and a chat room created in the messaging service.

The identifying of the reserved message scheduled to be sent may include identifying the reserved message scheduled to be sent based on information about a time scheduled to be sent.

The determining of whether the chat room is valid may include determining that the chat room is valid when there is a history of sending and receiving messages through the chat room and participant information in the chat room is not changed and determining that the chat room is invalid when there is no history of sending messages through the chat room or participant information in the chat room is changed.

The sending of the identified reserved message may include sending the identified reserved message through the chat room when it is determined that the chat room is valid and notifying that the reserved message is not sent to a terminal logged in with the first user account when it is determined that the chat room is invalid.

The record on the reserved message may include at least one of content of the reserved message, a time scheduled to send the reserved message, a destination of sending the reserved message, and a reminder setting for the reserved message.

The identifying of the reserved message scheduled to be sent may include changing the record based on an editing request of the record on the reserved message and identifying the reserved message scheduled to be sent based on the changed record.

The changing of the record may include limiting the changing of the record when a remaining time until a time scheduled to be sent in the record is less than a threshold time.

According to an aspect, there is provided a server that provides a reserved message function interlinked with an app for a messaging service including at least one processor configured to identify a reserved message scheduled to be sent based on a record on a reserved message stored corresponding to a first user account subscribing to the messaging service, determine whether a chat room corresponding to a destination of sending the identified reserved message is valid, and send the identified reserved message through the chat room based on the determining of whether the chat room is valid.

A reception confirmation status for a message received through the chat room before sending the reserved message may be changed in response to access to the chat room of a terminal logged in with the first user account.

The at least one processor may be configured to control a chat interface provided to a terminal logged in with a participant account of the chat room to display a changed reception confirmation status for the message received through the chat room.

The reserved message may be displayed on a chat interface corresponding to the chat room along with a mark to distinguish the reserved message from a general message.

The at least one processor may be configured to identify a reserved message to be reminded based on information about a reminder setting in the record on the reserved message and send a reminder message to notify that the reserved message to be reminded is scheduled to be sent through a predetermined type of chat room corresponding to the first user account.

The at least one processor may be configured to, in the identifying of the reserved message scheduled to be sent, change the record based on an editing request of the record on the reserved message and identify the reserved message scheduled to be sent based on the changed record.

The at least one processor may be configured to, in the changing of the record, limit the changing of the record when a remaining time until a time scheduled to be sent in the record is less than a threshold time.

BRIEF DESCRIPTION OF THE SEVERAL VIEWS OF THE DRAWINGS

These and/or other aspects, features, and advantages of the disclosure will become apparent and more readily appreciated from the following description of embodiments, taken in conjunction with the accompanying drawings of which.

DETAILED DESCRIPTION

Figure 1:
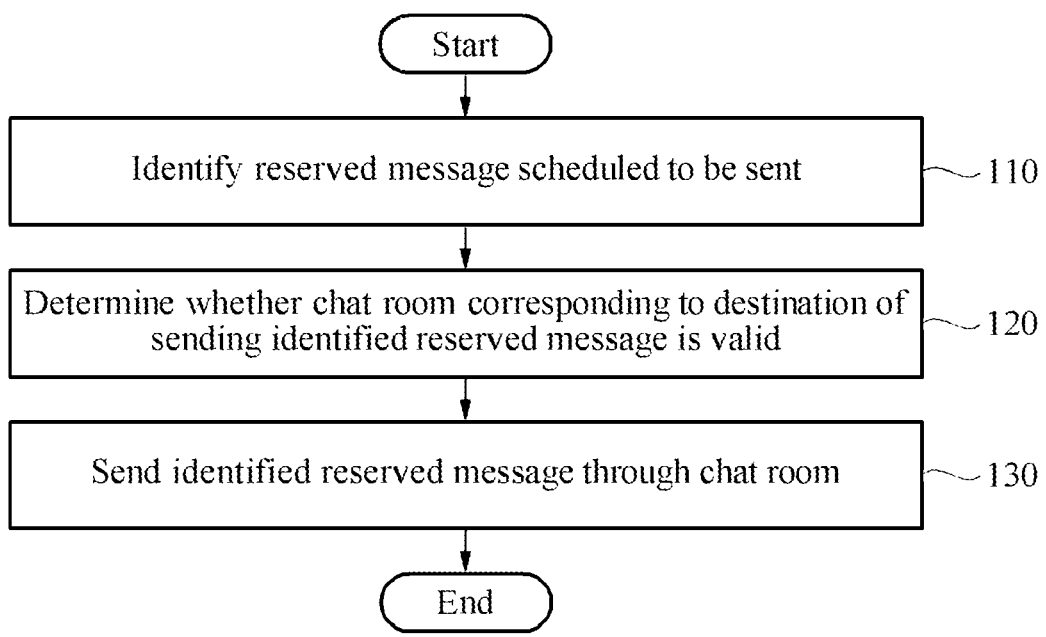
FIG. 1 is a flowchart illustrating an operation of a server that provides a reserved message function interlinked with an app for a messaging service according to an embodiment.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, embodiments will be described in detail with reference to the accompanying drawings. When describing the embodiments with reference to the accompanying drawings, like reference numerals refer to like components and a repeated description related thereto will be omitted.

FIG. 1 is a flowchart illustrating an operation of a server that provides a reserved message function interlinked with an app for a messaging service according to an embodiment.

Referring to FIG. 1, a method of operating a server that provides a reserved message function interlinked with an app for a messaging service according to an embodiment may include operation 110 of identifying a reserved message scheduled to be sent, operation 120 of determining whether a chat room corresponding to a destination of sending the identified reserved message is valid, and operation 130 of sending the identified reserved message through the chat room.

According to an embodiment, the server may provide services regarding the reserved message function interlinked with an app for a messaging service. The messaging service is a service that sends messages to subscribed users or receives messages from users and sends a notification message to the subscribed users, and may include, for example, an instant messaging service (IMS) based on an instant message.

According to an embodiment, a messaging server may create a user account for the messaging service in response to a messaging service subscription request from a user. The user account may be a unit for identifying, by a server, a user subscribing to the messaging service. A terminal logged in with the user account may use a service provided by the server. Hereinafter, the terminal may refer to a terminal logged in to a user account created by subscribing to the messaging service.

The terminal may be one of electronic devices including a computer, a portable computer, a wireless phone, a mobile phone, a smartphone, a personal digital assistant (PDA), a web tablet, a wearable device, and the like. The terminal may refer to any devices for installing and executing an app. Here, the terminal may receive a service and/or content provided by the server under the control of the app. Under the control of the app, the terminal may perform all service operations such as a configuration of a service screen, data input, data transmission and reception, and data storage. For example, the terminal may process a user interface or user interaction through a processor and may output a processing result through an output device of the terminal or transmit the result to the server.

According to an embodiment, an app installed in the terminal may include an app for the messaging service or a messenger app. The terminal may receive the messaging service under the control of the messenger app and may receive a reserved message function provided by the server. Hereinafter, the app for the messaging service may be referred to as an "app".

According to an embodiment, a chat interface may be provided to the terminal through the app. The chat interface is an interface for sending and receiving messages provided by the server, and may include, for example, an interface that provides a function of sending messages through a chat room in which at least one user account participates and displaying received messages. The chat interface may correspond to a chat room, which is virtual space in which at least one user account participates and the participants chat with each other.

According to an embodiment, the reserved message function is a type of secretary function provided to enhance user convenience in addition to a function of sending and receiving messages in an app for the messaging service and may refer to a function of sending a message pre-written by a user request to a predetermined destination at a predetermined time. For example, the reserved message function may further include a reserved message management function to register, inquire, and edit a reserved message corresponding to a user account in addition to a function of sending the reserved message.

According to an embodiment, the reserved message function may be provided by the messaging server or a separate server interlinked with the messaging server. For example, a part of the reserved message function may be provided by the messaging server, and another part thereof may be provided by the separate server interlinked with the messaging server. That is, a server that provides the reserved message function interlinked with an app for a messaging service may refer to the messaging server or the separate server implemented to provide the reserved message function through an app for the messaging service by interlinking with the messaging server. Hereinafter, the server that provides the reserved message function interlinked with an app for a messaging service may be simply referred to as a "server".

According to an embodiment, in operation 110, a server may identify a reserved message scheduled to be sent based on a record on a reserved message stored corresponding to a first user account subscribing to a messaging service. The first user account may correspond to a sender of the reserved message. The record on the reserved message is a unit of data generated by an execution of the reserved message function and may include, for example, at least one of content of the reserved message, the time scheduled to send the reserved message, a destination (or a receiver) of sending the reserved message, and whether to set a reminder for the reserved message. Depending on the context, the reserved message may refer to the record on the reserved message.

For example, a terminal logged in with the first user account may request creation of a reserved message to a server by executing the reserved message function provided through an app. The reserved message creation request may include information about the reserved message, such as content of the reserved message, the time scheduled to send the reserved message, a destination of sending the reserved message, and/or whether to set a reminder for the reserved message. The server may create a record on the reserved message based on a reserved message creation request including information about a new reserved message. The created record may be stored corresponding to the first user account.

According to an embodiment, the content of the reserved message may include content to be sent as a reserved message. For example, the content to be sent as a reserved message may include various types of content such as a text, an emoticon, a video, and/or an image.

According to an embodiment, the time scheduled to send the reserved message may include a date value and a time value indicating the time to send the reserved message. The time scheduled to send the reserved message may be set to a time after a time of requesting creation of the reserved message. To this end, the time before a request time may be deactivated and displayed or may not be displayed on an interface that sets the time scheduled to send the reserved message.

According to an embodiment, a destination of sending a reserved message may include at least one of a second user account subscribing to the messaging service and/or a chat room created in the messaging service. For example, the second user account designated as the destination of sending the reserved message may correspond to a user account registered as a friend relationship corresponding to the first user account. Any user using the messaging service may register identification information, such as a phone number and an identification (ID), about other user accounts subscribing to the messaging service as a user account as a friend relationship through an app. A user may designate a user account registered as a friend relationship as the destination of sending the reserved message through an app.

In another example, a chat room designated as a destination of sending a reserved message may correspond to a chat room in which the first user account participates. The chat room is virtual chat space provided by the messaging service, in which at least one user account may participate. A first user who is an arbitrary user using the messaging service may access an app and participate in the chat room with the first user account, which is their own user account and the chat room in which the first user account participates may be stored corresponding to the first user account. For example, identification information of the chat room in which the first user account participates may be mapped to the identification information of the first user account and stored in a messaging server or a database accessible by a server. For example, the identification information of the chat room in which the first user account participates may be mapped to the identification information of the first user account and stored in a terminal. The first user may set any one chat room in which their user account is participating as the destination of sending the reserved message through an app. Abuse using the reserved message function, such as setting the reserved message to be repeatedly sent to any chat room, by limiting a chat room that may be set as the destination of sending the reserved message to the chat room in which the first user account is participating, rather than any chat room may be prevented.

According to an embodiment, a reminder setting of a reserved message may include a setting whether the first user account who requests to send the reserved message receives a message for reminding that the reserved message is to be sent. For example, the reminder setting may further include time information to receive the reminder. The time to receive the reminder may be determined based on the time scheduled to send the reserved message. For example, the time to receive the reminder may be set to 1 day before, 15 minutes before, or the like based on the time scheduled to send the reserved message. For example, a reminder setting may further include a repetition setting of the reminder. For example, the reminder may be set to be repeated at regular intervals until confirmed by the first user account.

According to an embodiment, operation 110 may include identifying a reserved message scheduled to be sent based on information about the time scheduled to be sent in a record on a reserved message. A record of which the time scheduled to be sent arrives may be identified as a reserved message scheduled to be sent among record(s) of the reserved messages stored corresponding to the first user account.

According to an embodiment, a server may identify a reserved message to be reminded based on information about a reminder setting in the record on the reserved message. The reminder of the reserved message is described in detail below.

According to an embodiment, operation 110 may include changing a record based on an editing request of the record on a reserved message and identifying the reserved message scheduled to be sent based on the changed record. Although described in detail below, the record on the reserved message registered corresponding to the first user account may be changed according to the editing request of a user. For example, at least one of content of the reserved message, the time scheduled to send the reserved message, a destination of sending the reserved message, and whether to set a reminder for the reserved message in the record on the reserved message may be changed by the editing request.

According to an embodiment, the changing of the record may include limiting the changing of the record when the remaining time until the time scheduled to be sent in the record is less than a threshold time. That is, an editable time of the record on a registered reserved message may be limited based on the time scheduled to send the reserved message. For example, a server may change the record on the reserved message based on the editing request of the record on the reserved message only before the threshold time (e.g., 15 minutes before the time scheduled to be sent) of the time scheduled to send the reserved message. Furthermore, when the time remaining until the time scheduled to send the reserved message is less than the threshold time, the server may limit the changing of the record on the corresponding reserved message. According to an embodiment, the server may limit changing of a record on a reserved message that is sent and/or a record on a reserved message that failed to be sent.

According to an embodiment, in operation 120, a server may determine whether a chat room corresponding to a destination of sending an identified reserved message is valid. For example, when the destination of sending a reserved message is set to the second user account, a chat room corresponding to the destination of sending the reserved message may refer to a chat room including the first user account and the second user account. For example, when the destination of sending the reserved message is set to a first chat room, a chat room corresponding to the destination of sending the reserved message may refer to the first chat room set as the destination of sending the reserved message.

According to an embodiment, operation 120 may include, when there is a history of sending and receiving messages through a chat room corresponding to a destination of sending a reserved message, determining that the chat room is valid, and when there is no history of sending messages through the chat room corresponding to the destination of sending the reserved message, determining that the chat room is invalid. That is, when there is a chat room in which there is a history of sending and receiving messages between the first user account and the second user account designated as the destination of sending the reserved message, it may be determined that the chat room corresponding to the destination of sending the reserved message is valid. Alternatively, when there is a history of sending and receiving messages through a chat room designated as the destination of sending the reserved message, it may be determined that the chat room corresponding to the destination of sending the reserved message is valid.

According to an embodiment, a destination of sending a reserved message may be set to a chat room in a valid state. For example, after a reserved message is created with the destination of sending that is set to the first chat room, the first chat room may be changed to an invalid state. For example, before the reserved message is sent, in case that the first chat room is deleted, the first user account leaves the first chat room, or all other user accounts participating in the first chat room except for the first user account leave or withdraw from the messaging service, it is determined that the first chat room is invalid. For example, even when at least one user account participating in the first chat room leaves the first chat room or withdraws from the messaging service so participant information of the first chat room is changed, it is determined that the first chat room is invalid.

According to an embodiment, in operation 130, based on the determination of whether the chat room is valid, a server may send a reserved message identified through a chat room corresponding to a destination of sending the reserved message. That is, the reserved message may be sent through a chat room in which the first user account and the second user account designated as a destination of sending the reserved message participate or a chat room designated as the destination of sending the reserved message.

According to an embodiment, operation 130 may include sending an identified reserved message through a corresponding chat room when it is determined that the chat room corresponding to a destination of sending a reserved message is valid. For example, when the destination of sending the reserved message is the second user account, a terminal logged in with the second user account may receive the reserved message through a chat room in which the first user account and the second user account participate. For example, when the destination of sending the reserved message is the first chat room, a terminal logged in with a user account participating in the first chat room may receive the reserved message through the first chat room.

Figure 2A:
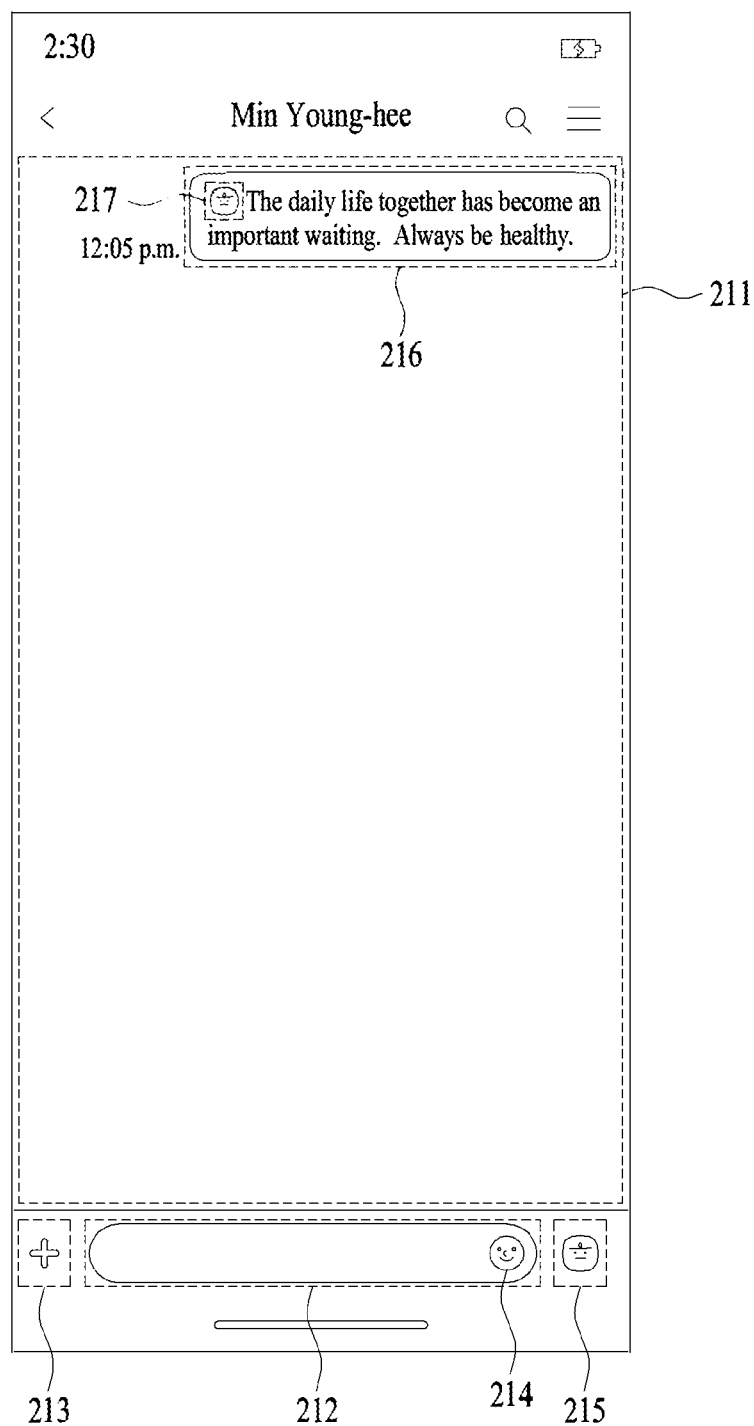
FIG. 2A is a diagram illustrating a screen of a chat interface to which a reserved message is sent, according to an embodiment.

According to an embodiment, a reserved message may be displayed on a chat interface corresponding to a chat room along with a mark to distinguish the reserved message from a general message. For example, the mark to distinguish the reserved message from a general message may include a mark indicating a reserved message. For example, referring to FIG. 2A, shown is a screen 201 of a chat interface corresponding to a chat room in which a reserved message 216 with "Min Young-hee" as a destination of sending a reserved message. Unlike a general message, a mark 217 indicating a reserved message may be added to the reserved message 216. The mark 217 added to the reserved message 216 shown in FIG. 2A is only an example of displaying the reserved message 216 separately from a general message in the chat interface, and the reserved message 216 may be displayed to be distinguished from a general message in various ways. For example, the reserved message 216 may be displayed to be distinguished from a general message by displaying a color and/or a shape of a speech balloon in which a general message and the reserved message are displayed differently or adding the mark 217 indicating a reserved message adjacent to a speech balloon corresponding to the reserved message 216.

Figure 2B:
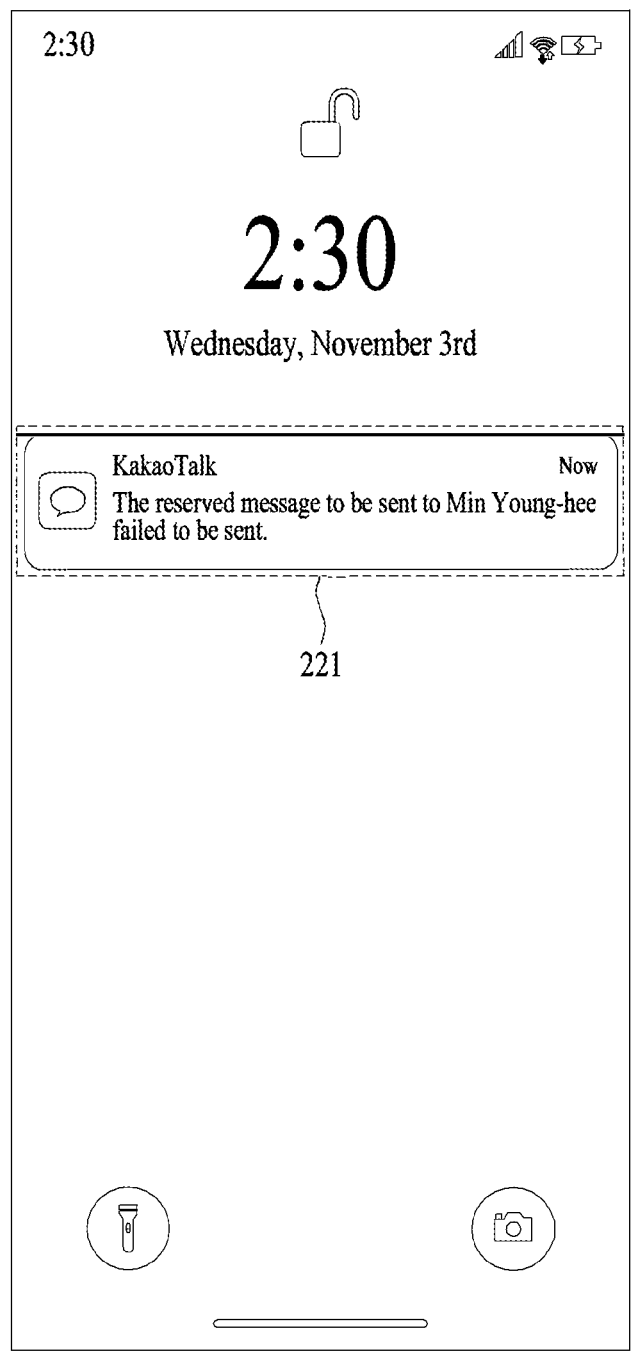
FIG. 2B is a diagram illustrating a screen of a terminal to which a failure to send message for a reserved message is sent, according to an embodiment.

According to an embodiment, when it is determined that a chat room corresponding to a destination of sending a reserved message is invalid, the reserved message is not sent and exception processing may be performed. For example, when there is no chat room corresponding to the destination of sending the reserved message or there is no history of sending and receiving messages through the chat room corresponding to the destination of sending the reserved message, it may be determined that the chat room is invalid. In addition, as described above, although the first chat room set as the destination of sending the reserved message is valid at the time of creating the reserved message, it may be determined that the first chat room is invalid, when the first chat room is deleted before sending the reserved message after the reserved message is created, when all other user accounts participating in the first chat room except for the first user account leave, or when participant information of the first chat room is changed. That is, according to an embodiment, operation 130 may include, when it is determined that a chat room corresponding to a destination of sending a reserved message is invalid, notifying that the reserved message is not sent to a terminal logged in with the first user account. According to an embodiment, even in case that the reserved message is not sent through the chat room, the reserved message may not be sent and exception processing may be performed. For example, in case that the reserved message is not sent through the chat room due to a network error, the reserved message may not be sent and exception processing may be performed. According to an embodiment, the reserved message may be in a status of "waiting to send" until switched to a status of "possible to send" during a predetermined time (e.g., 5 minutes) based on a sending condition such as a network state, or the reserved message may be treated as a failure to send when exceeding the predetermined time. For example, a server may send a failure to send message that notifies that the reserved message is not sent to a terminal logged in with the first user account. For example, referring to an interface screen 202 shown in FIG. 2B, the failure to send message may be sent to a terminal in the form of a push message 221. In another example, the failure to send message may be sent in the form of an instant message through a certain type of chat room.

The type of a chat room may be determined based on at least one of the number of user accounts in a chat room and a method of participating in the chat room. For example, the type of a chat room may include a chat room with me that does not include other user accounts, a 1:1 chat room that includes one other user account, and a group chat room that includes two or more other user accounts. In another example, the type of a chat room may include a general chat room and an anonymous chat room. The general chat room may correspond to a chat room created by designating another user account(s) in which account information is registered in a messenger application as a participant in the chat room. A user of the messenger application may register identification information about a user account, such as a phone number and an ID, as a user account, which is a friend relationship. The general chat room may refer to a chat room including account information registered in the messenger application or other user account(s) registered as a friend relationship as a participant. The anonymous chat room may refer to a chat room in which an account subscribing to the messaging service may participate through link information regardless of whether participants in an anonymous chat room and the account subscribing to the messaging service are in a friend relationship in the messenger application. For example, the anonymous chatroom service may include an open chat service (a registered trademark of Kakao Corp.) provided by Kakao, that is, the applicant of the present disclosure, and more specifically, a non-acquaintance-based open chat service provided by a KakaoTalk application of the applicant of the present disclosure. The anonymous chatroom may mean a chatroom of the open chat service provided by Kakao, that is, the applicant of the present disclosure. The open chat service provided by Kakao is an example of an anonymous chatroom service, and examples are not limited thereto. The anonymous chatroom service may include a service providing a chatroom in which the user participates by using a temporary profile, not a real-name-based account.

For example, a failure to send message may be sent through a chat room with me. For example, the failure to send message may be sent using an official account for the reserved message function as a sender through the chat room with me. The official account is a type of account subscribing to the messaging service and may refer to an account to send a notification message for a company or a service or to send an advertisement message for a company or a service. For example, the official account for the reserved message function may be implemented as a chatbot.

In another example, the failure to send message may be sent through a chat room with the official account for the reserved message function. The chat room with the official account for the reserved message function may correspond to a chat room to which a notification message for the reserved message function including the failure to send message is sent. The notification message for the reserved message function may be sent using the official account for the reserved message function as a sender.

According to an embodiment, a reception confirmation status for a message received through a chat room corresponding to a destination of sending a reserved message before sending the reserved message may be changed in response to access to the corresponding chat room of a terminal logged in with the first user account. The message sent through the chat room before sending the reserved message may refer to a message sent by another user account participating in the chat room other than the first user account. The reception confirmation status for a message may be set as a status not confirmed to be received by the corresponding user account before a user account, which is a receiver of the message, accesses a chat room in which the message is sent and may be set as a status confirmed to be received after the corresponding user account accesses the corresponding chat room. That is, the reception confirmation status for the message sent through the chat room may be maintained regardless of sending of the reserved message. For example, a message not confirmed to be received by the first user account among messages sent through the chat room before the reserved message is sent may be displayed as a message still not confirmed to be received by the first user account even after the reserved message using the first user account as a sender is sent. A message not confirmed to be received by the first user account among messages sent through a chat room may be displayed as a new message to a terminal logged in with the first user account. When the terminal logged in with the first user account accesses a chat room, the message sent through the chat room may be changed to a message confirmed to be received by the first user account.

A method of operating a server according to an embodiment may further include controlling a chat interface provided to a terminal logged in with a participant account of a corresponding chat room to display a changed reception confirmation status for a message sent through a chat room. For example, a server may control a chat interface provided to a terminal of the first user account and the second user account through a terminal.

Figure 3A:
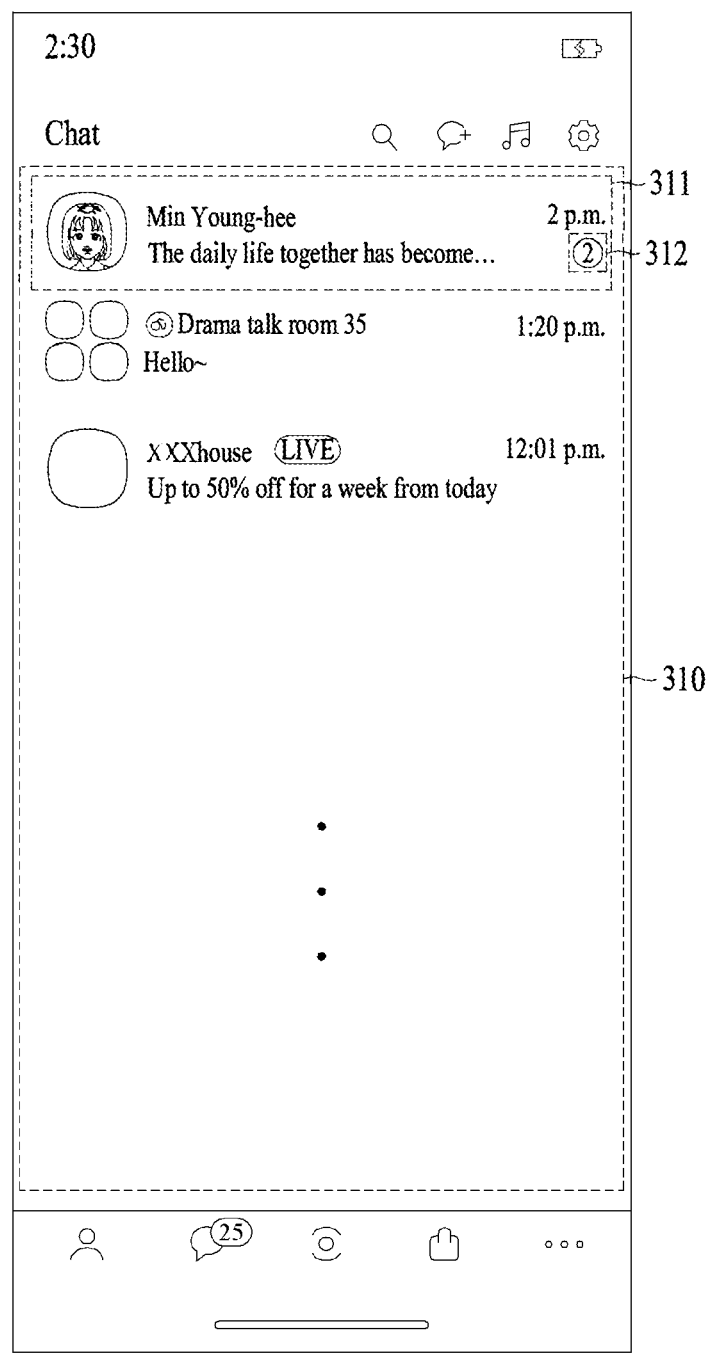
FIG. 3A is a diagram illustrating a screen of an interface including a chat list provided through an app to a terminal of a first user account according to an embodiment.

For example, FIG. 3A is a diagram illustrating a screen 301 of an interface including a chat list provided through an app to a terminal of the first user account. Referring to FIG. 3A, a list 310 of chat rooms in which the first user account is participating may be displayed on the interface. For example, the list 310 of chat rooms may include item(s) of chat rooms in which the first user account is participating. The items of each chat room may include a name of a chat room or a name of a user account participating in the chat room, recent messages sent and received through the chat room, and time information of the recent messages sent and received through the chat room. The list of chat rooms may include a mark indicating that new messages are received through the chat room and/or information on the number of new messages not confirmed to be received, which are sent through the chat room. The new messages may refer to messages in which a reception is not confirmed by the first user account. For example, referring to an item 311 of the chat room, there may be a mark 312 displaying that two new messages are received through the chat room.

According to an embodiment, a chat room corresponding to the item 311 of the chat room may correspond to a chat room to which a reserved message is sent. The mark 312 displaying that two new messages are received may be maintained on the item 311 of the chat room before the first user account accesses the corresponding chat room even after a reserved message using the first user account as a sender is sent through the chat room to which the reserved message is sent. When a terminal of the first user account accesses the chat room, a reception confirmation for a received message may be changed. As the reception confirmation is changed, the mark 312 indicating that a new message is received in the item 311 of the chat room may be removed.

Figure 3B:
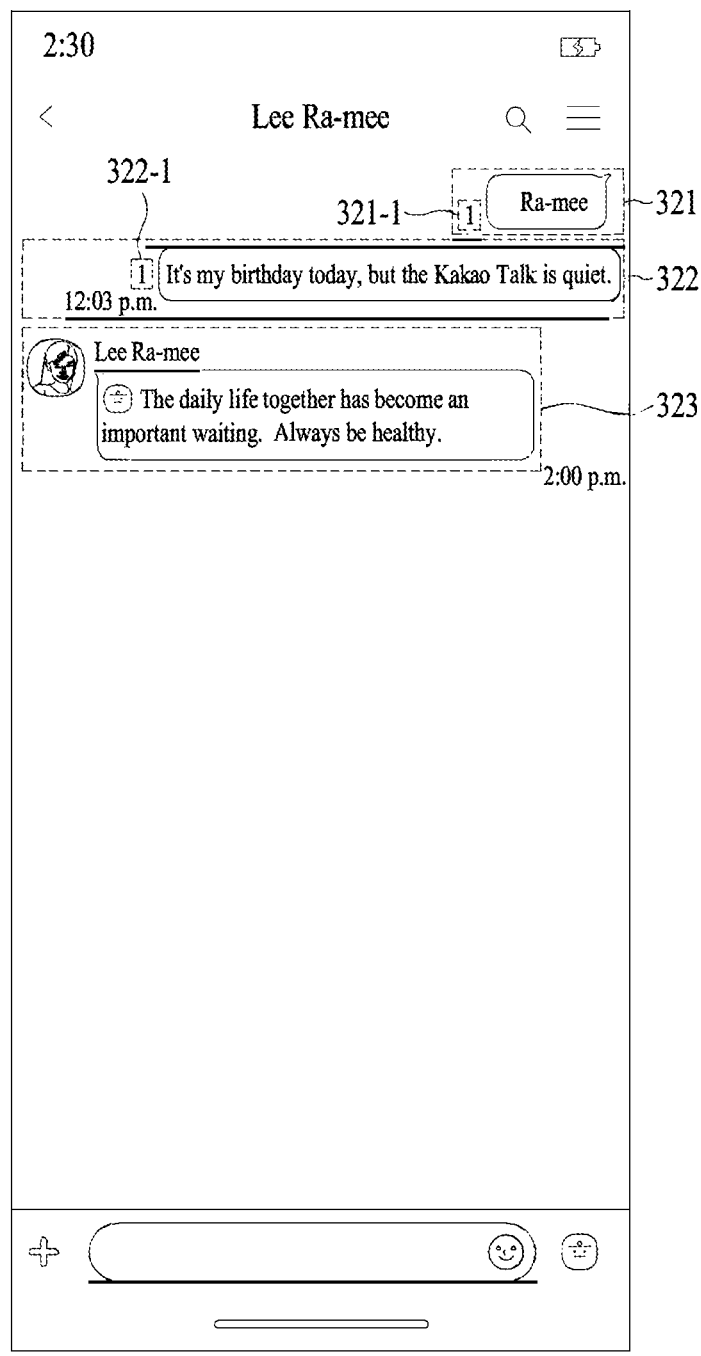
FIG. 3B is a diagram illustrating a screen of a chat interface provided through an app to a terminal of a second user account according to an embodiment.

For example, FIG. 3B is a diagram illustrating a screen 302 of a chat interface provided through an app to a terminal of the second user account. The chat interface shown in FIG. 3B may correspond to a chat room in which the first user account and the second user account participate. Referring to FIG. 3B, the chat interface corresponding to the chat room may display messages 321 and 322 and reserved messages 323 sent and received through the chat room. For example, the reserved message 323 using the first user account as a sender may be displayed through the chat interface. The messages 321 and 322 sent by the second user account through a chat room before the reserved message 323 is sent may respectively include marks 321-1 and 322-1 displaying that a reception is not confirmed by the first user account. When the terminal of the first user account accesses the chat room, a reception confirmation status for the messages 321 and 322 may be changed. As the reception confirmation status thereof changes, the marks 321-1 and 322-1 displaying that a reception is not confirmed may be changed to a mark displaying that a reception is confirmed or may be removed from the chat interface.

A method of operating a server according to an embodiment may further include identifying a reserved message to be reminded, based on information about a reminder setting in a record on the reserved message, and sending a reminder message to notify that the reserved message to be reminded is to be sent through a certain type of chat room corresponding to the first user account.

According to an embodiment, a server may identify a reserved message to be reminded, based on information about the time to receive a reminder in a record on the reserved message. That is, a record in which the reminder is set among record(s) of the reserved message stored corresponding the first user account and the time to receive the reminder arrives may be identified as a reserved message to be reminded.

Figure 4:
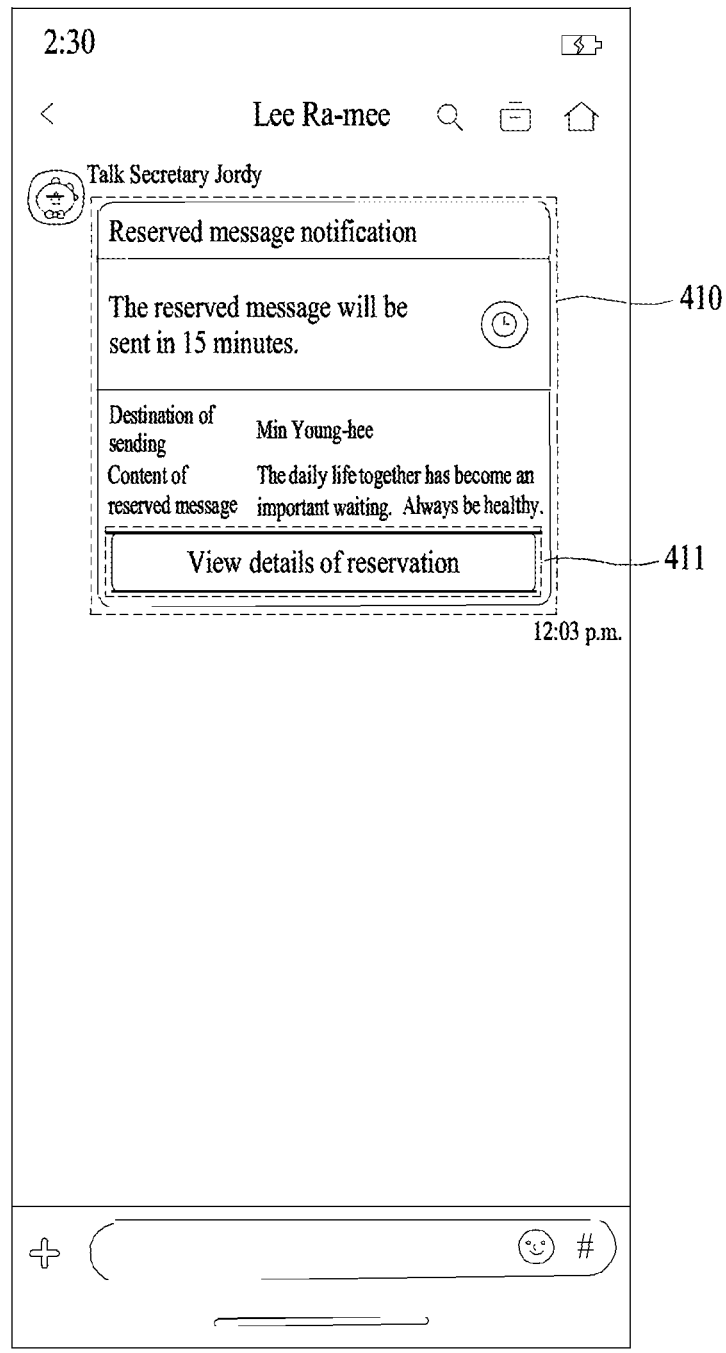
FIG. 4 is a diagram illustrating a screen of a chat interface to which a reminder message for a reserved message is sent, according to an embodiment.

FIG. 4 is a diagram illustrating a screen of a chat interface to which a reminder message for a reserved message is sent according to an embodiment.

According to an embodiment, a reminder message may be sent in the form of an instant message through a certain type of chat room. For example, referring to a screen 401 shown in FIG. 4, a reminder message 410 may be sent through a chat room with me. The reminder message may be sent using the official account for the reserved message function as a sender. The reminder message may include information about a reserved message (e.g., a destination and content of sending a reserved message) and information notifying that the reserved message is to be sent at the time scheduled to be sent. The reminder message may include an interfacing object 411 linked to a detailed page for the reserved message. When an input for selecting the interfacing object 411 is received, the detailed page for the reserved message may be provided.

In another example, a reminder message may be sent through a 1:1 chat room with the official account for the reserved message function.

Figure 5A:
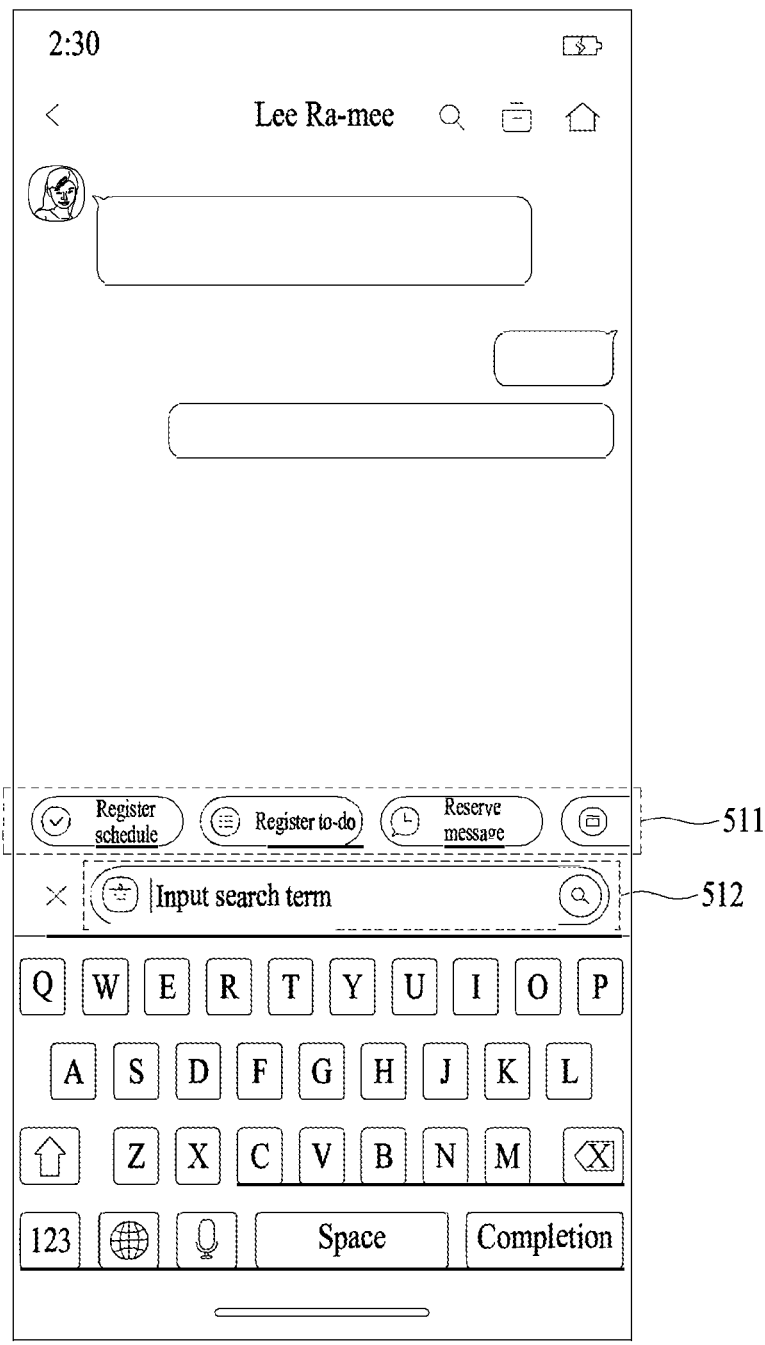
FIGS. 5A to 5C are diagrams illustrating an interface screen to create a reserved message according to an embodiment.
Figure 5B:
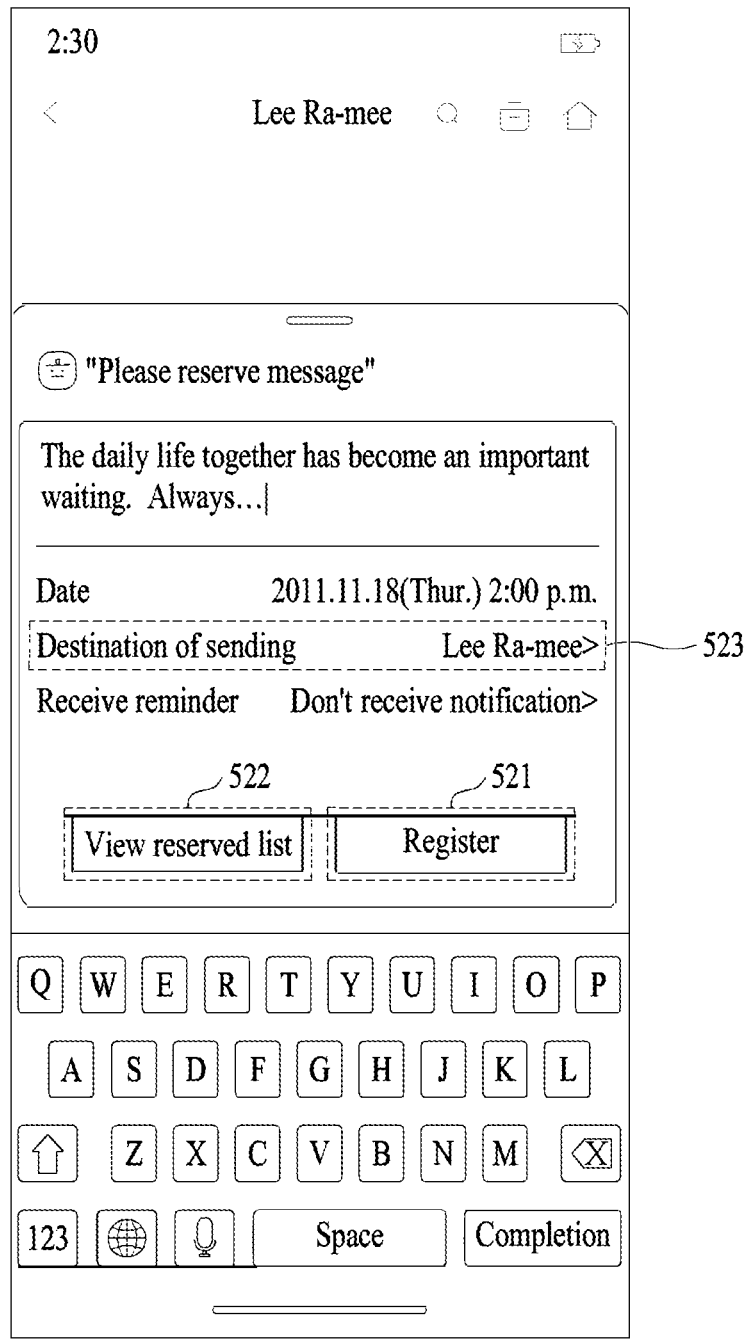
Figure 5C:
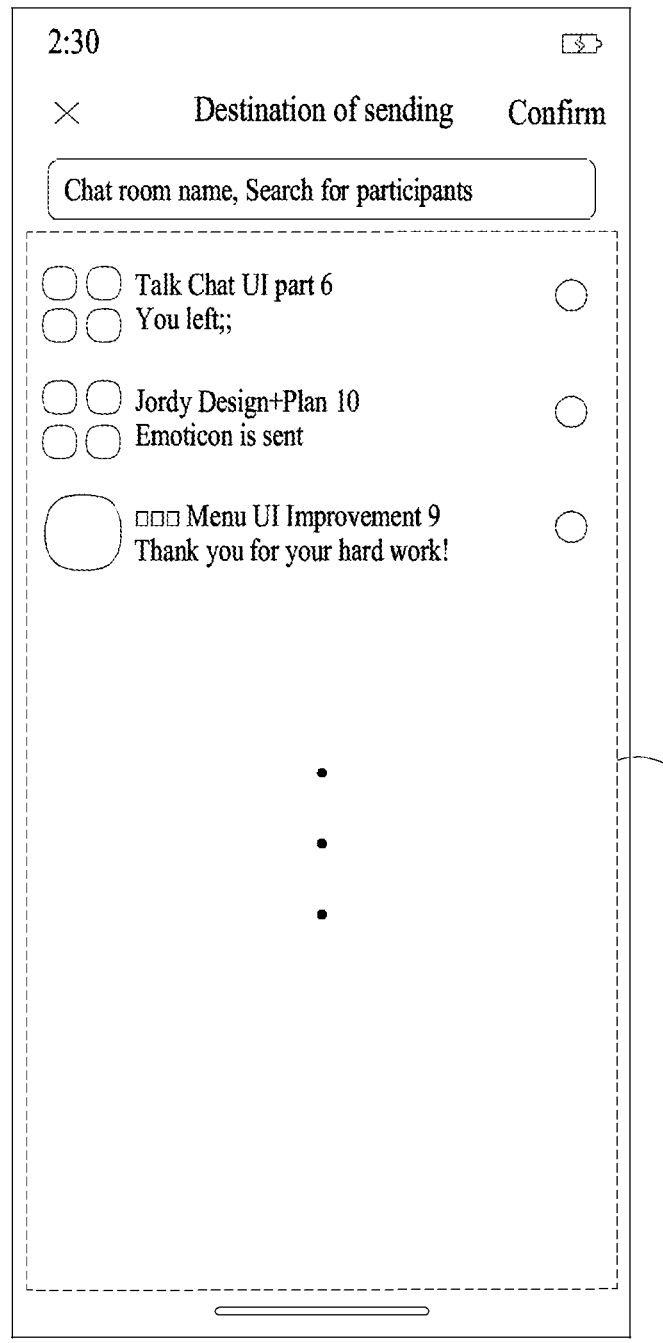

FIGS. 5A to 5C are diagrams illustrating an interface screen to create a reserved message according to an embodiment.

According to an embodiment, a reserved message creation request may be received through a chat interface corresponding to a secretary mode. The secretary mode is a type of an input mode of a chat interface and may correspond to an input mode for calling a secretary function. The secretary function is a function provided to enhance user convenience in addition to a function related to sending and receiving messages in a messenger application, and the reserved message function described above may correspond to an example of the secretary function. The secretary function may further include at least one of, for example, a search function through a chat room, a schedule management function, and a to-do management function, besides the reserved message function. The secretary function may be provided in a messaging server or in a separate server interlinked with the messaging server. A server may provide a chat interface corresponding to the secretary mode to a terminal.

Referring to a screen 501 shown in FIG. 5A, a chat interface in the secretary mode may include an interfacing object for calling the secretary function. For example, a chat interface in the secretary mode corresponding to a chat room may include a search window 512 for calling a search function and a secretary function menu 511 including an interfacing object for calling a schedule management function, a to-do management function, and the reserved message function.

According to an embodiment, when an input for selecting a button in the secretary function menu 511 is received, a terminal may call the secretary function corresponding to the selected button. That is, the input for selecting a button in the secretary function menu 511 may refer to an input for calling at least one secretary function. For example, the reserved message function may be called by an input for selecting a "reserve message" button in the secretary function menu 511.

Referring to a screen 502 shown in FIG. 5B, when the reserved message function is called through a chat interface switched to the secretary mode, an interface for creating a reserved message in some areas of the chat interface (hereinafter, a reserved message creation interface) may be displayed. The reserved message creation interface may not be limited to the shape of the screen 502 shown in FIG. 5B. For example, the reserved message creation interface may be displayed overlapping a chat interface corresponding to a chat room and may be displayed through some areas (e.g., the upper part of a virtual keyboard, the lower part of the virtual keyboard, or an area in which the virtual keyboard is displayed) in the chat interface.

For example, an input for selecting the "reserve message" button in the secretary function menu 511 shown in FIG. 5A may correspond to calling the reserved message function. The reserved message creation interface may provide a function for creating (or registering) a new reserved message. For example, a user may input information (e.g., content of the reserved message, the time scheduled to send the reserved message, a destination of sending the reserved message, and/or whether to set a reminder for the reserved message) about the new reserved message through the reserved message creation interface. The user may request to create the reserved message to a server through an input for selecting a "register" button 521 of the reserved message creation interface. The server may create the requested reserved message and register the requested reserved message in a reserved message database subordinating to the user account. According to an embodiment, when at least some (e.g., at least one of content of the reserved message, the time scheduled to send the reserved message, a destination of sending the reserved message, and whether to set a reminder for the reserved message) of information about the reserved message is not input thereto, the "register" button 521 may not be activated.

According to an embodiment, when creating a reserved message, a user may input a destination of sending the reserved message created through the reserved message creation interface. As described above, the destination of sending the reserved message may include at least one user account and/or at least one chat room. As shown in a screen 503 shown in FIG. 5C, an interface for inputting the destination of sending the reserved message may be provided by an input for selecting an item 523 of the destination of sending the reserved message.

Referring to FIG. 5C, an interface for inputting a destination of sending may include a list 531 of chat rooms in which a user account is participating. The interface for inputting the destination of sending may include a picker for selecting each item in the list 531 of chat rooms. Although not shown in FIG. 5C, the interface for inputting the destination of sending may include a list of user accounts registered as a friend relationship with the user account. According to an embodiment, one or more chat rooms and/or one or more user accounts may be selected as the destination of sending the reserved message.

A server according to an embodiment may automatically input chat room information to a destination of sending a reserved message based on a chat room where the reserved message function is requested. For example, when the reserved message function is requested through a certain chat room, the corresponding chat room or a user account participating in the chat room may be automatically input to a destination of sending the reserved message. A user who requests creation of a reserved message may perform a modification, such as deleting the destination of sending the reserved message automatically input through the reserved message creation interface or adding a destination of sending a new reserved message.

Figure 6A:
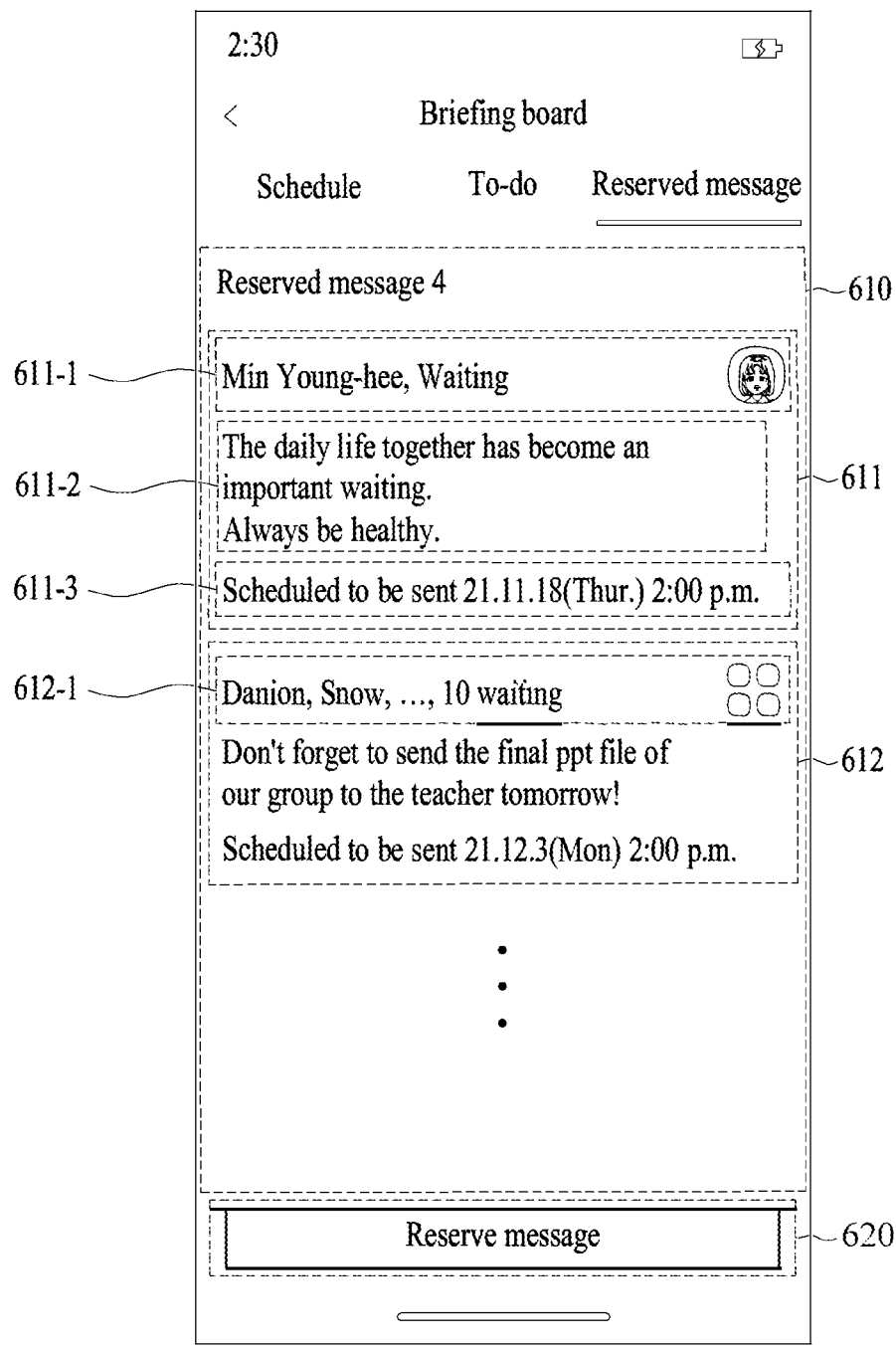
FIGS. 6A to 6C are diagrams illustrating an interface screen for an inquiry about and edition of a reserved message according to an embodiment.
Figure 6B:
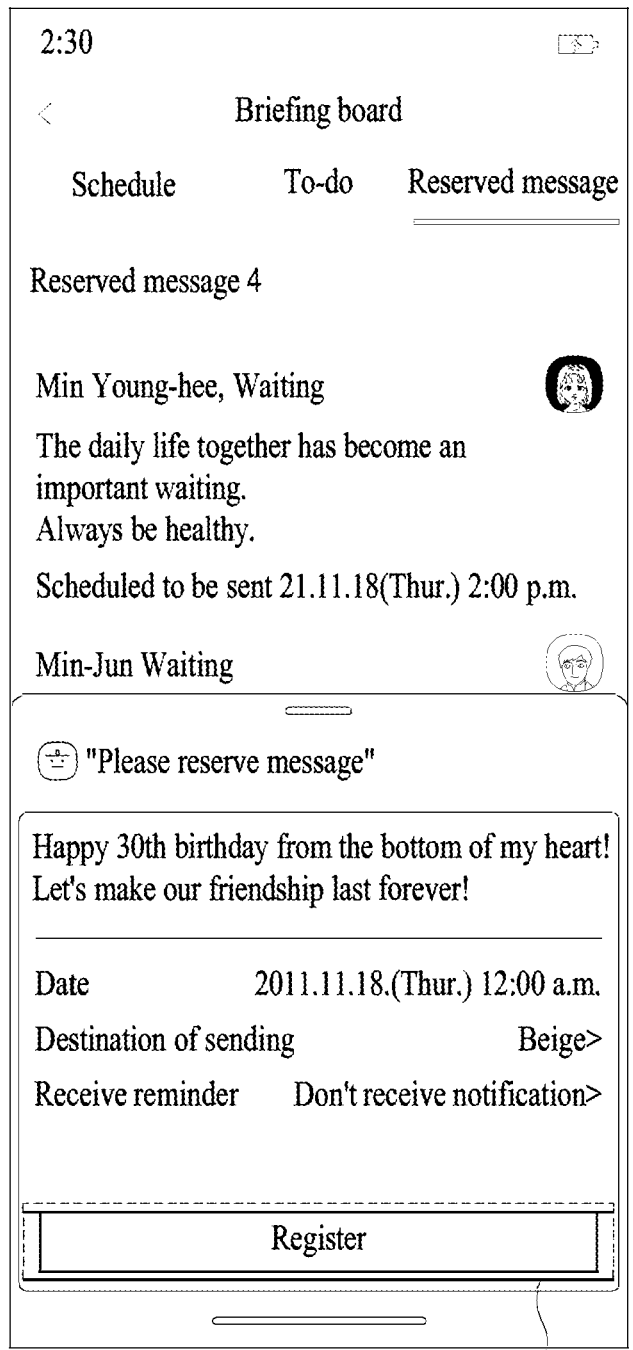
Figure 6C:
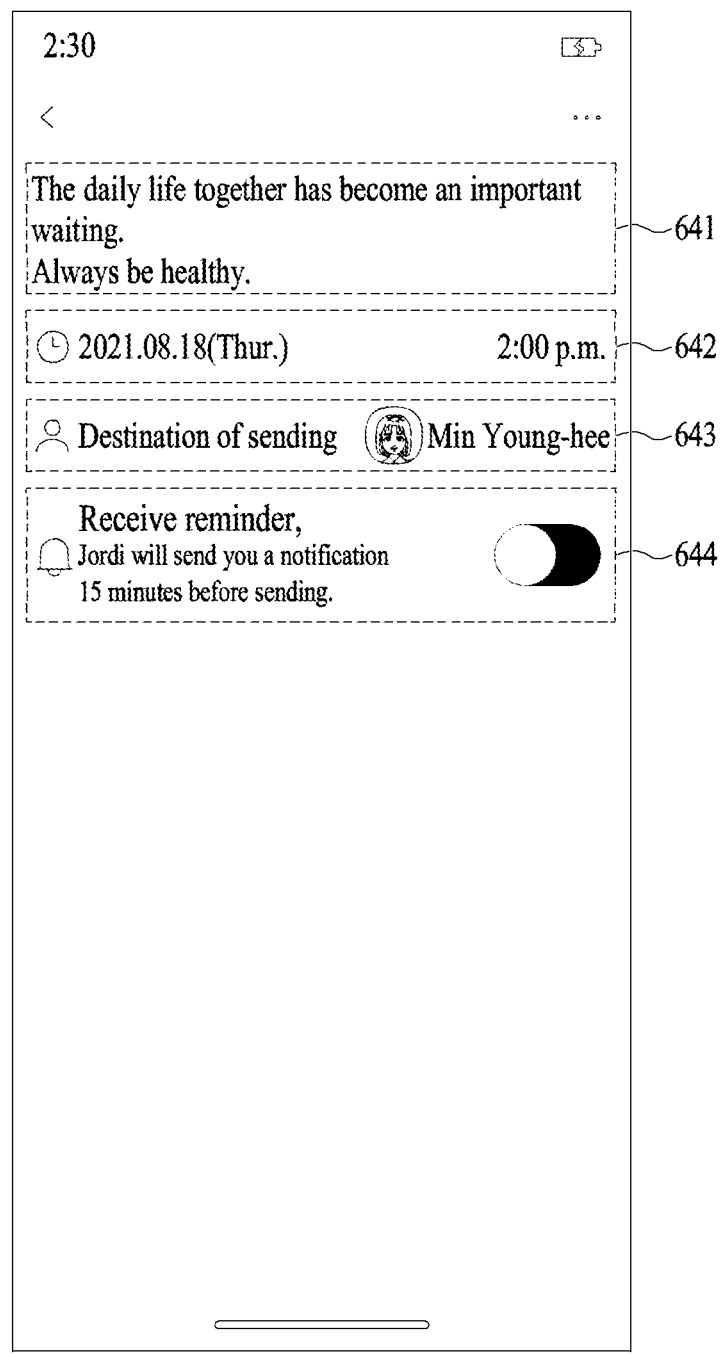

FIGS. 6A to 6C are diagrams illustrating an interface screen for an inquiry about and edition of a reserved message according to an embodiment.

For example, a screen 601 of an interface for inquiring about a reserved message (hereinafter, referred to as a reserved message inquiry interface) shown in FIG. 6A may be displayed on a terminal in response to an input for selecting a "view reserved list" button 522 shown in FIG. 5B.

Referring to FIG. 6A, the reserved message inquiry interface may include a list 610 of records on a reserved message registered corresponding to a user account logged in to a terminal. The records on the reserved message are a data unit including information (e.g., content of the reserved message, the time scheduled to send the reserved message, a destination of sending the reserved message, and/or whether to set a reminder for the reserved message) about the reserved message, and may be referred to as a "reserved message".

For example, the reserved message inquiry interface may display the list 610 of reserved messages corresponding to a date on which the reserved message function is called. In another example, the list 610 of reserved messages registered corresponding to the user account may be displayed. For example, the maximum number of reserved messages that may be registered corresponding to the user account may be limited. For example, reserved messages corresponding to the user account may be registered to be less than or equal to "10".

According to an embodiment, the list 610 of reserved messages may include items, for example, first and second items 611 and 612 of the reserved messages including information about the reserved message. For example, the first item 611 in the list 610 of reserved messages may include a destination 611-1 of sending the reserved message, content 611-2 of the reserved message, and a time 611-3 scheduled to send the reserved message. A destination of sending the reserved message may be set to the second user account like the destination 611-1 of sending of the first item 611 or a 1:1 chat room with the second user account, or a chat room like a destination 612-1 of sending of the second item 612.

According to an embodiment, the list 610 of reserved messages may further include information about statuses (e.g., waiting, completion to send, and/or failure to send) for each item. For example, a reserved message may be in a status of "waiting" before the time scheduled to be sent and may be in a status of "completion to send" when the time scheduled to be sent arrives and the reserved message is sent to the destination of sending, and may be in a status of "failure to send" when the time scheduled to be sent arrives but the reserved message is not sent to the destination of sending. According to an embodiment, a message in a status of "completion to send" may not be in the list 610 of reserved messages as the message is considered to no longer correspond to a reserved message. According to an embodiment, a list for each status may be displayed to the reserved messages. For example, a list of the reserved messages in a status of "waiting", a list of the reserved messages in a status of "completion to send", and a list of reserved messages in a status of "failure to send" may be displayed on each interface and the list for each status may be displayed separately through different tabs.

According to an embodiment, a reserved message corresponding to a date on which the reserved message management function is called may be preferentially displayed on the list 610 of reserved messages displayed on the reserved message inquiry interface. For example, when the date on which the reserved message management function is called is Nov. 18, 2021, the reserved message corresponding to the date of Nov. 18, 2021, may be preferentially displayed.

According to an embodiment, the reserved messages in the list 610 of reserved messages may be arranged in chronological order of the time scheduled to be sent. For example, as shown in the screen 601 shown in FIG. 6A, the first and second items 611 and 612 of reserved messages in the list 610 of the reserved messages may be arranged in an order of a reserved message having the time scheduled to be sent early to a reserved message having the time scheduled to be sent later.

According to an embodiment, the reserved message inquiry interface may provide a function for registering a new reserved message. When a "reserve message" button 620 is selected, an interface for registering the new reserved message may be provided.

According to an embodiment, the reserved message inquiry interface may provide a function for editing the registered reserved message. When the first and second items 611 and 612 of the reserved message are selected, an interface for editing the selected reserved message may be provided.

For example, a screen 602 of an interface for registering a new reserved message shown in FIG. 6B may be displayed on a terminal in response to a new reserved message registration function called by an input for selecting the "reserve message" button 620 shown in FIG. 6A.

Referring to FIG. 6B, a user may input information (e.g., content of the reserved message, the time scheduled to send the reserved message, a destination of sending the reserved message, and whether to set a reminder for the reserved message) about a new reserved message through an interface for registering the new reserved message. The user may request reserved message creation corresponding to information input to a server through an input for selecting a "register" button 630 of the interface for registering the new reserved message. The server may create the requested reserved message and register the requested reserved message in the reserved message database subordinating to the user account.

For example, a screen 603 of an interface for editing a reserved message shown in FIG. 6C may be displayed on a terminal in response to a reserved message editing function called by an input for selecting the first item 611 of reserved messages shown in FIG. 6A.

Referring to FIG. 6C, a user may modify information (e.g., content 641 of the reserved message, a time 642 scheduled to send the reserved message, a destination 643 of sending the reserved message, and whether to set 644 a reminder for the reserved message) about a reserved message registered through the interface for editing the reserved message.

For example, an editable time of a registered reserved message may be limited based on the time scheduled to send the reserved message. For example, when the remaining time until the time scheduled to be sent that is set in the reserved message is less than a threshold time, editing of the corresponding reserved message may be limited. For example, editing of a reserved message that is to be sent and/or a reserved message that failed to be sent may be limited.

According to an embodiment, a server providing the secretary function interlinked with an app for a messaging service may include a processor, a memory, and a communication module.

According to an embodiment, the processor of the server may perform at least one operation of the server described with reference to FIG. 1. For example, the processor of the server may perform at least one of operation 110 of identifying a reserved message scheduled to be sent based on a record on a reserved message stored corresponding to the first user account subscribing to the messaging service described with reference to FIG. 1, operation 120 of determining whether a chat room corresponding to a destination of sending the identified reserved message is valid, and operation 130 of sending the identified reserved message through the chat room.

According to an embodiment, the memory of the server may store data necessary for performing the method described with reference to FIG. 1 and/or data generated by performing the method described with reference to FIG. 1. The memory may include a volatile memory or a non-volatile memory.

According to an embodiment, the memory of the server may store a program in which the method described with reference to FIG. 1 is implemented. The processor of the server may execute the program stored in the memory and may control the server. Code of the program executed by the processor of the server may be stored in the memory.

According to an embodiment, the server may be connected to an external device (e.g., a terminal or a network) through the communication module and exchange data therewith.

The examples described herein may be implemented using a hardware component, a software component, and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is singular; however, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the examples may be recorded in non-transitory computer-readable media including program instructions to implement various operations of the examples. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

The above-described hardware devices may be configured to act as one or more software modules in order to perform the operations of the above-described examples, or vice versa.

Although the examples have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, and/or replaced or supplemented by other components or their equivalents.

Therefore, other implementations, other embodiments, and equivalents to the claims are also within the scope of the following claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a server that provides a reserved message function interlinked with an app for a messaging service, the method comprising:
identifying a reserved message scheduled to be sent based on a record on a reserved message stored corresponding to a first user account subscribing to the messaging service;
determining whether a chat room corresponding to a destination of sending the identified reserved message is valid, wherein the determining of whether the chat room is valid comprises:
determining that the chat room is valid when there is a history of sending and receiving messages through the chat room and participant information in the chat room is not changed; and
determining that the chat room is invalid when there is no history of sending messages through the chat room or participant information in the chat room is changed; and
sending the identified reserved message through the chat room in response to determining that the chat room is valid.

2. The method of claim 1, wherein a reception confirmation status for a message received through the chat room before sending the reserved message is changed in response to access to the chat room by a terminal logged in with the first user account.

3. The method of claim 2, further comprising:
controlling a chat interface provided to a terminal logged in with a participant account of the chat room to display a changed reception confirmation status for the message received through the chat room.

4. The method of claim 1, wherein the reserved message is displayed on a chat interface corresponding to the chat room along with a mark to distinguish the reserved message from a general message.

5. The method of claim 1, further comprising:
identifying a reserved message to be reminded based on information about a reminder setting in the record on the reserved message; and
sending a reminder message to notify that the reserved message to be reminded is scheduled to be sent through a predetermined type of chat room corresponding to the first user account.

6. The method of claim 1, wherein the destination of sending the reserved message comprises at least one of:
a second user account subscribing to the messaging service; and
a chat room created in the messaging service.

7. The method of claim 1, wherein the identifying of the reserved message scheduled to be sent comprises identifying the reserved message scheduled to be sent based on information about a time scheduled to be sent.

8. The method of claim 1, wherein the sending of the identified reserved message comprises:
sending the identified reserved message through the chat room when it is determined that the chat room is valid; and
notifying that the reserved message is not sent to a terminal logged in with the first user account when it is determined that the chat room is invalid.

9. The method of claim 1, wherein the record on the reserved message comprises at least one of content of the reserved message, a time scheduled to send the reserved message, a destination of sending the reserved message, and a reminder setting for the reserved message.

10. The method of claim 1, wherein the identifying of the reserved message scheduled to be sent comprises:
changing the record based on an editing request of the record on the reserved message; and
identifying the reserved message scheduled to be sent based on the changed record.

11. The method of claim 10, wherein the changing of the record comprises limiting the changing of the record when a remaining time until a time scheduled to be sent in the record is less than a threshold time.

12. A non-transitory computer-readable storage medium storing instructions that, when executed by a processor, cause the processor to perform a method comprising:

identifying a reserved message scheduled to be sent based on a record on a reserved message stored corresponding to a first user account subscribing to the messaging service;

determining whether a chat room corresponding to a destination of sending the identified reserved message is valid, wherein the determining of whether the chat room is valid comprises:

determining that the chat room is valid when there is a history of sending and receiving messages through the chat room and participant information in the chat room is not changed; and determining that the chat room is invalid when there is no history of sending messages through the chat room or participant information in the chat room is changed; and sending the identified reserved message through the chat room in response to determining that the chat room is valid.

13. A server that provides a reserved message function interlinked with an app for a messaging service, the server comprising:

at least one processor configured to:

identify a reserved message scheduled to be sent based on a record on a reserved message stored corresponding to a first user account subscribing to the messaging service;

determine whether a chat room corresponding to a destination of sending the identified reserved message is valid, wherein the determining of whether the chat room is valid comprises:

determining that the chat room is valid when there is a history of sending and receiving messages through the chat room and participant information in the chat room is not changed; and determining that the chat room is invalid when there is no history of sending messages through the chat room or participant information in the chat room is changed; and send the identified reserved message through the chat room in response to determining that the chat room is valid.

14. The server of claim 13, wherein a reception confirmation status for a message received through the chat room before sending the reserved message is changed in response to access to the chat room of a terminal logged in with the first user account.

15. The server of claim 14, wherein the at least one processor is configured to control a chat interface provided to a terminal logged in with a participant account of the chat room to display a changed reception confirmation status for the message received through the chat room.

16. The server of claim 13, wherein the reserved message is displayed on a chat interface corresponding to the chat room along with a mark to distinguish the reserved message from a general message.

17. The server of claim 13, wherein the at least one processor is configured to:

identify a reserved message to be reminded based on information about a reminder setting in the record on the reserved message; and send a reminder message to notify that the reserved message to be reminded is scheduled to be sent through a predetermined type of chat room corresponding to the first user account.

18. The server of claim 13, wherein the at least one processor is configured to, in the identifying of the reserved message scheduled to be sent:

change the record based on an editing request of the record on the reserved message; and identify the reserved message scheduled to be sent based on the changed record.

19. The server of claim 18, wherein the at least one processor is configured to, in the changing of the record, limit the changing of the record when a remaining time until a time scheduled to be sent in the record is less than a threshold time.

* * * * *